Figure 1:
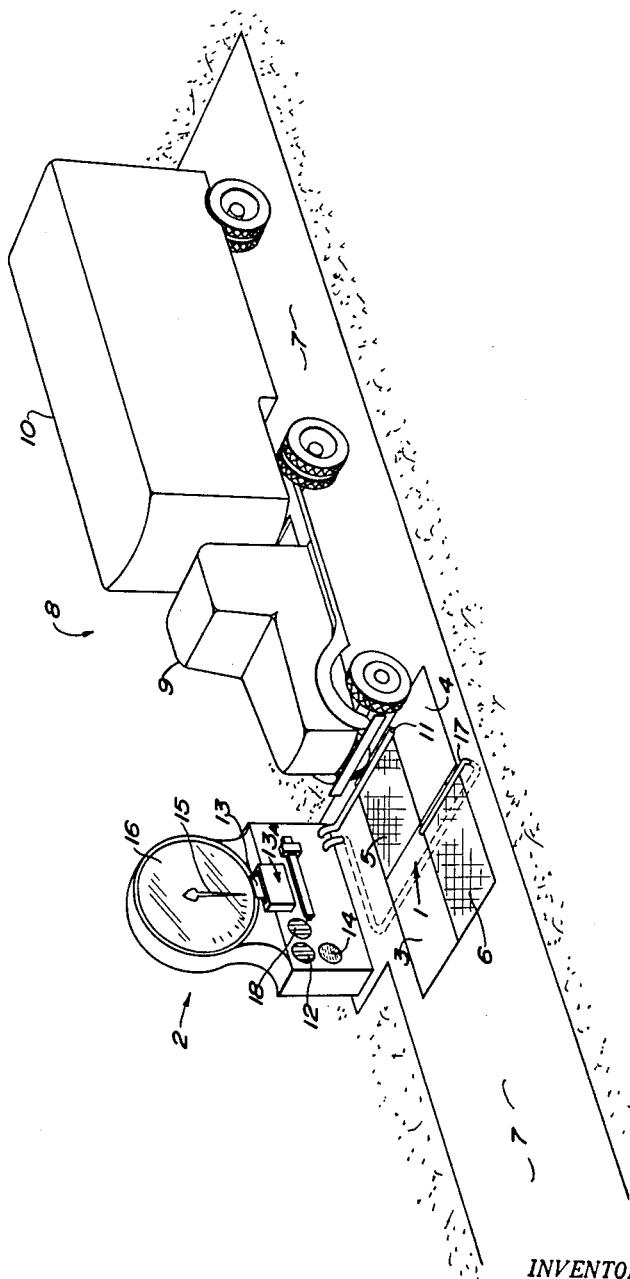
Figure 9:
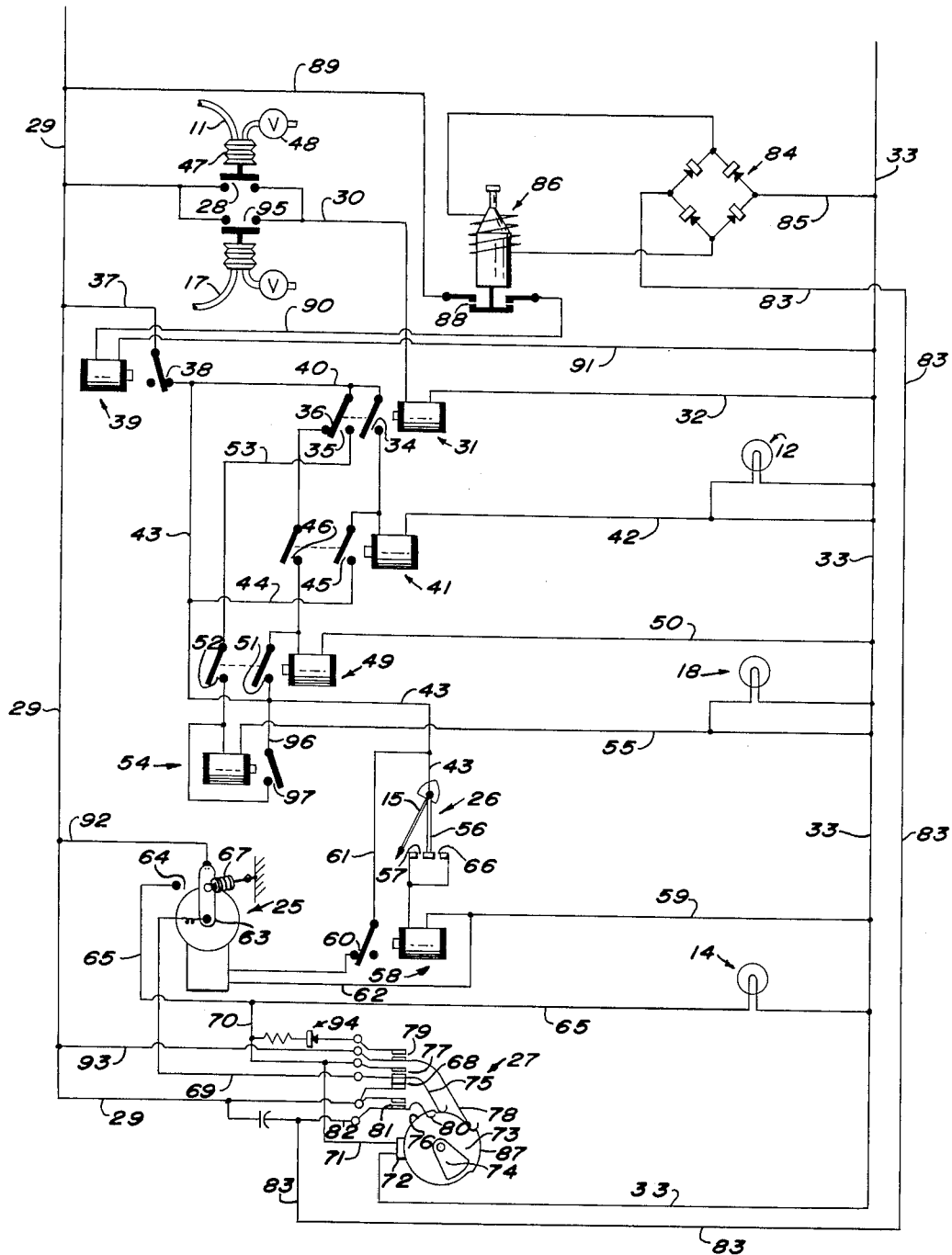

May 22, 1956  G. C. REISER  2,746,738
WHEEL LOAD TRUCK SCALE

Filed Oct. 28, 1952  3 Sheets-Sheet 1

INVENTOR.
GEORGE C. REISER
BY
Marshall, Marshall & Yeasting
ATTORNEYS

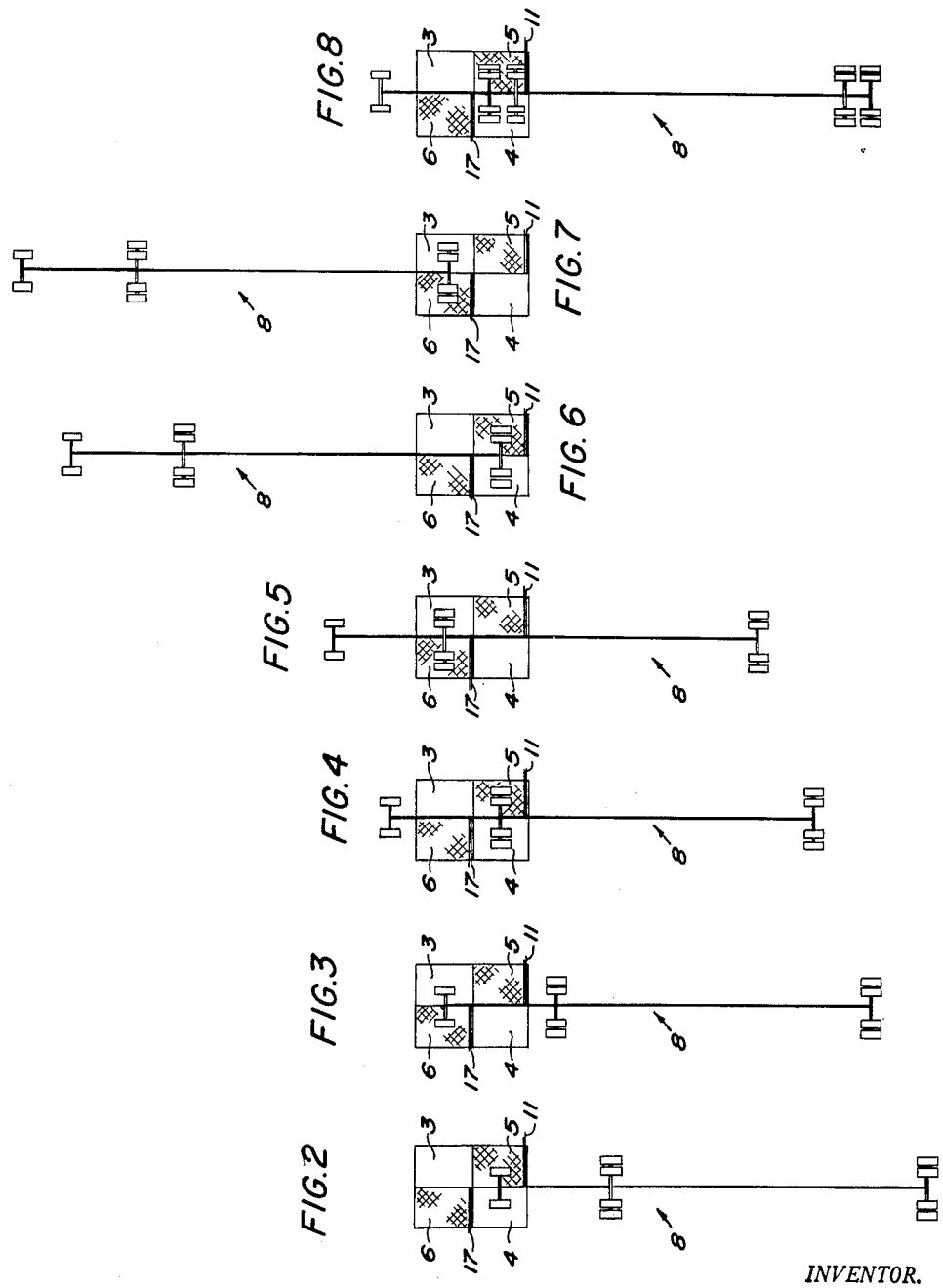

May 22, 1956  G. C. REISER  2,746,738
WHEEL LOAD TRUCK SCALE
Filed Oct. 28, 1952  3 Sheets-Sheet 3

INVENTOR.
GEORGE C. REISER
BY
Marshall, Marshall & Yeasting
ATTORNEYS

United States Patent Office 2,746,738
Patented May 22, 1956

2,746,738

WHEEL LOAD TRUCK SCALE

George C. Reiser, Toledo, Ohio, assignor to Toledo Scale Company, Toledo, Ohio, a corporation of New Jersey Application October 28, 1952, Serial No. 317,293

4 Claims. (Cl. 265—5)

This invention relates to weighing scales adapted to measure wheel loads of trucks, and in particular to an improved load receiver for weighing a truck wheel by wheel.

Most States have regulations which have been set up to control the maximum weight allowable on trucks traveling highways. The purpose of these regulations is to preserve road surfaces. For some time, the maximum allowable weight was based on the gross loading of the truck. After careful study, it was determined that the gross loading of a truck was not as important a factor as the weight on each axle. It was found that overloading the axles did more damage to the highways than overloading the truck. Also, if the axle load was within the limits, but the load on the wheels was not properly distributed therefore causing overloading of one of the wheels, still greater destruction to the roads resulted. Since proper distribution of the load on the truck is an important factor in the preservation of road surfaces, it is desirable that the load be not only evenly distributed on the axles, but also be evenly distributed over the wheels. It is not altogether uncommon for truckers to so distribute their load that they have the proper axle load, but have most of the weight of the axle load over one of the wheels.

Trucking concerns are becoming increasingly aware of the advantages resulting from proper distribution of loads on trucks and trailers. Correct loading and distributtion of loads cut down operating and repair costs on the equipment. This is especially true in the increased tire life noticeable as the result of proper distribution of weight. They have also found that by checking the trucks at the point of loading, there is a saving of fines which are levied by law enforcement officials of the various States for overloading.

The main object of this invention is to aid in the preservation of roads traveled by trucks.

Another object of this invention is to provide a weighing scale for measuring wheel loads of a truck to aid in properly distributing the load.

Ancillary thereto is the saving of fines which might otherwise have to be paid if portions of the truck are overloaded due to improper distribution of the load.

Another object is to reduce operating and repair costs of trucks.

Still another object is to provide a load receiver for a weighing scale adapted to weigh individual wheel loads, which load receiver is so constructed and arranged as to permit the wheel loads to be measured while the truck advances only in a straight path.

A further object is to provide a wheel load weighing scale which is adapted to weigh wheel loads of either single-wheeled or tandem-wheeled trucks.

Other objects and advantages will be apparent from the following description in which reference is had to the accompanying drawings.

According to the invention, a load receiver of a weighing scale has two diagonally situated rectangular decks. The decks are so arranged that when a truck approaches the load receiver from a certain prescribed direction, a first wheel on one side of the truck is positioned on one of the decks, a weighing of the load over the wheel is taken, and then the truck is moved forward until the wheel on the same axle but on the opposite side of the truck is positioned on the other deck for weighing its load in the same manner as the first. The remaining wheels are positioned on their respective decks as the truck is driven forward so as to place the wheels in weighing position.

In the drawings:

Figure I is a view in perspective of a weighing scale embodying the instant invention, the scale load receiver being installed in a driveway having ramps upon one of which a truck is shown.

Figure II is a simplified plan view illustrating the position of a truck with respect to the load receiver when the truck is in position for weighing the load on the right front wheel.

Figures III through VII are figures similar to Figure II showing the various positions of the truck with respect to the load receiver when the other loads on other wheels of the truck are being weighed.

Figure VIII is a simplified plan view showing the position of tandem-truck wheels in position for weighing.

Figure IX is a schematic wiring diagram of the control system for the instant invention.

Referring to Figure I, a load receiver 1 is operatively connected to a printing weighing scale 2 in the usual manner. Since the weighing mechanism of this general type of scale is well known in the art, and since it does not form a part of the instant invention, it is not shown and will be described only so far as is necessary to fully illustrate the instant invention. Adjacent the load receiver 1 are a pair of dead decks 3 and 4 which are rectangular in shape and are diagonally situated with respect to each other. The load receiver 1 comprises two live decks 5 and 6 which are similarly shaped but are situated diagonally opposite the decks 3 and 4.

The load receiver 1 is generally level with a ramp 7 on which a truck 8 approaches the load receiver to be weighed. As shown in Figure I, the truck 8 comprises a tractor 9 and a trailer 10 each of which are provided with single axles. The rear tractor wheels and the rear trailer wheels are shown as being of the dual type. Since the two adjacent tires together support one wheel load, they will be referred to as one wheel.

The dead decks 3 and 4 are not connected to the mechanism which supports the live decks 5 and 6. They merely support the wheel on the opposite end of the axle from the wheel which is being weighed. The live decks 5 and 6 are supported as a unit, so that when a load is being taken on one live deck, the other live deck will move correspondingly. It is to be understood that although the live decks 5 and 6 appear to be independent from one another, they are not so. They are the opposite ends of the load receiver 1.

As a truck approaches the load receiver 1 to weigh the load on each of the wheels, the right front tractor wheel trips a gas-station-type air hose 11 which lies along the leading edge of the live deck 5 transversely to the path of movement of the truck 8. Tripping of the air hose 11 operates pneumatically-operated contacts of the control system of the scale to light a first hold-truck red light 12 which signals the driver to stop the truck because his right front wheel is in weighing position on the live deck 5. Closing of the contacts operated by the air hose 11 also sets up a printing operation to provide a printed record of each wheel load on a ticket 13 issued by printing mechanism 13a. Portions of the printing mechanism 13a are operatively connected to the weighing mechanism of the scale. While the printing mechanism, such as the type shown in Pat. No. 2,390,482 to Williams, is making an imprint, a white light 14 goes on, indicating to the driver that the printing operation is taking place. The weighing scale 2 is also provided with an indicator 15 and a cooperating chart 16 to provide visual indications of the loads counterbalanced by the weighing mechanism.

After the printing operation has been completed, the lights 12 and 14 go out and the ticket 13 advances to present another portion thereof into printing position. When the lights 12 and 14 go out, it indicates to the truck driver that he should move his truck ahead so as to position his left front tractor wheel on the live deck 6 to weigh the wheel load on that wheel. As the left front wheel arrives on the live deck 6, it trips an air hose 17 similar to the air hose 11. In the preferred form of the invention, the air hose 17 is placed along the leading edge of the live deck 6 and can be tripped only by wheels on the left side of the truck. The air hose 17 may, however, extend across both the dead deck 3 and the live deck 6, in which case it would be tripped by the wheels on both sides of the truck. The air hose 11 can be tripped only by the wheels on the right side of the truck, as shown in Figure I, but it too may extend across both the live deck 5 and the dead deck 4 if so desired.

When the hose 17 is tripped, it closes pneumatically-operated contacts which set up the same operations as those set up when the hose 11 closed its contracts. An imprint of the weight of the wheel load on the left front tractor wheel is also made on the ticket 13. When the lights 12 and 14 again go out, the truck should be moved ahead to position the right rear tractor wheel on the live deck 5. This wheel, and the remainder of the wheels of the tractor 9 and trailer 10 are weighed as previously described.

After all of the wheel loads of the truck 8 have been weighed, the driver may leave the truck and obtain the ticket 13. The ticket 13 is preferably of a type that issues from a roll and can be torn from the roll. On the ticket is a printed record of the load on each wheel. By adding the loads on the wheels on the opposite ends of an axle, the driver would get the axle load. In this way he can check to see that he has not overloaded his axle and can also check to see that his load is properly distributed in the trailer 10. It is not desirable that all of the wheel load weights be added together to obtain the total truck weight, because variations caused by shifting of the truck enter into the accumulating of the wheel load weights to arrive at a total.

For weighing wheel loads on tandem wheels, an additional hold-truck red light 18 is provided. When single wheels are being weighed, the driver should hold the truck each time the red lights 12 goes on. When weighing tandem wheels, it is necessary that the light 18 also go on in addition to the red light 12. The light 18 goes on after the particular air hose is tripped the second time by the rear of the tandem wheels. It is desirable that some sort of a sign be placed so as to be viewed by all drivers before they drive onto the load receiver to instruct them that for weighing single wheels the truck should be stopped when light 12 goes on, and when weighing tandem wheels the trucks should be stopped when the lights 12 and 18 both go on.

The red lights 12 and 18 and the white light 14 are preferably grouped together, and should be so placed that they can be seen by the driver of the truck being weighed at all times. As shown in Figure I the lights are placed on the front of the scale 2 and with this arrangement it is desirable in some cases that the truck be provided with a mirror in which the driver can at all times see the lights. Many other arrangements are suitable, however.

Referring now to Figures II through VII, the truck 8 is shown in successive positions for weighing the loads on the several wheels. In Figure II, the right front tractor wheel load is being weighed on the live deck 5, while the left front wheel rests on the dead deck 4. The rear tractor wheels and the trailer wheels are still on the ramp 7. After each weighing, the truck is moved ahead to the position shown in the next figure. In Figure III, the left front tractor wheel has been located on the live deck 6 and the previously weighed right front tractor wheel rests on the dead deck 3. After the weighing, the truck is again moved ahead to weigh the load on the right rear tractor wheel on the deck 5 as shown in Figure IV. In Figure V the truck 8 has been driven ahead to place the left rear tractor wheel in weighing position on the live deck 6. In Figure VI, the truck has been driven ahead to place the right rear tractor wheel in weighing position on the live deck 5. In Figure VII, the left rear tractor wheels are placed in weighing position on the live deck 6. After taking the weighing of the wheel load shown in Figure VII, the truck 8 may be driven ahead and the driver may leave the truck to obtain the ticket having the six wheel load weights printed thereon.

Figure VIII illustrates a truck having tandem rear tractor wheels and tandem trailer wheels. The steps in weighing the load of a set of tandem wheels are similar to those described for weighing single wheel loads, except that both tandem wheels should be on one live deck at a time as shown in Figure VIII. It is necessary that the hose 11 shown in that figure be operated twice to light both of the hold-truck red lights 12 and 18.

The control system employed in the instant invention is illustrated in Figure IX. A timing mechanism 25 and a mechanism 26 for preventing premature printing, such as that shown in Pat. No. 2,333,982, to Brown are incorporated with the controls to prevent an imprint of a wheel load weight from being taken until after the weighing mechanism has come to rest. A set of cam-operated contacts 27 such as that shown in the previously mentioned patent to Williams, is also used with the controls.

As the truck wheel trips the air hose 11 in driving onto the load receiver 1 to assume the position shown in Figure II, its set of pneumatically-operated contacts 28 close and current flows through a power lead 29, through the closed contacts 28, to a lead 30, to the coil of a relay 31, and then a lead 32 and a return lead 33. Energization of the relay 31 closes its normally opened contacts 34 and 35 and opens its normally closed contacts 36. Closing of the contacts 34 permits current to flow from the lead 29 through a lead 37, a pair of normally closed contacts 38 of a relay 39, through a lead 40, through the closed contacts 34 to the coil of a relay 41, and then through a lead 42 and the lead 33. When current flows through the lead 42, it lights the hold-truck red light 12 which is in parallel with the lead 42. The relay 41, when once energized, holds itself in by current flowing through the closed contact 38, a lead 43, a branch lead 44, through a set of closed contacts 45 of the relay 41 which were closed when the relay 41 was energized, through the coil of the relay 41, and then through the opposite side of the line. A pair of contacts 46 of the relay 41 also were closed when the relay 41 was energized.

The pneumatically-operated contacts 28 are closed by a bellows 47. The bellows 47 is provided with a relief valve 48 to permit the contacts 28 to be closed only momentarily and then open, should a truck wheel stop on the hose 11. Opening of the contacts 28 stops current flow the to coil of the relay 31 and de-energizes the relay. When the relay 31 is de-energized, its contacts 34 and 35 open and its contacts 36 close. Closing of the contacts 36 permits current to flow through the closed contacts 38, the lead 40, the closed contacts 36, the closed contacts 46 of the held-in-relay 41, to the coil of a relay 49, and then through a lead 50 and the opposite side of the line. Sets of normally open contacts 51 and 52 are closed and current flows through the closed contacts 38, the lead 43, the closed contacts 51, to the coil of the relay 49 to hold the relay energized.

In weighing single wheel loads, the relay 49 serves no real function. It is necessary, however, when weighing tandem wheel loads, to set up the additional steps for lighting the hold-truck red light 18. If tandem wheels are being weighed, as the first of the tandem wheels passes over the hose 11, it will set up the controls already described. As the second of the tandem wheels passes over the hose 11, the relay 31 is again energized through the contacts 28 to close its contacts 34 and 35 and open its contacts 36. It will be remembered that the relays 41 and 49 were held energized when the first wheel tripped the hose 11. Consequently, the contacts 45, 46, 51, and 52, remained closed. The closing of the contacts 35 when the relay 31 was energized a second time permits current to flow through the contacts 38, the lead 40, the closed contacts 35, a lead 53, the closed contacts 52, to the coil of a relay 54, and then through a lead 55 and the lead 33. The red light 18 goes on when current flows through the lead 55 since the light is wired in parallel with the lead 55. The relay 54 is held energized by current flowing through the contacts 38, the lead 43, a branch lead 96, a set of closed contacts 97 of the relay 54, to the coil of that relay and then through the opposite side of the line.

As long as the indicator 15 is moving, it indicates that the scale has not yet come to rest. An arm 56 is mounted loosely on the indicator shaft and is adapted to move with the indicator. If the indicator 15 moves clockwise during weighing, the arm 56 will likewise move clockwise until a set of contacts 57 are closed. Closing of contacts 57 causes current to flow from the lead 43, through the arm 56, the closed contacts 57 to the coil of a relay 58, and then through a lead 59 and the opposite side of the line. As long as the contacts 57 remain closed, which they will be until the indicator 15 stops its clockwise movement, the relay 58 will remain energized and have its normally closed contacts 60 remain open.

After the scale has come to rest, the arm 56 which is mounted on the indicator shaft assumes the position shown in Figure IX whereby the contacts 57 will open to de-energize the relay 58 and close the contacts 60 to permit current to flow from the lead 43, through a lead 61, the closed contacts 60 to the coil of the timing mechanism 25, and then through a lead 62 and the leads 59 and 33. When the timing mechanism 25 is energized, its arm 63 is rotated counterclockwise until it engages a portion of a set of contacts 64 carried by a lead 65. In the preferred embodiment of the invention it takes approximately four seconds for the arm 63 to reach the contact 64. This means the contacts 60 of the relay 58 must remain closed for those four seconds. Should the load receiver 1 receive a jar which would disturb the weighing mechanism and cause the indicator 15 to oscillate, the contacts 57 or a set of contacts 66 would be closed by movement of the arm 56 in the direction in which the indicator moves. Closing of either of the contacts 57 or 66 would energize the relay 58 and open its contacts 60. Opening of the contacts 60 would stop current flow to the coil of the timing mechanism 25 and reset the arm 63 to its original position. A return spring 67 is shown as being capable of resetting the timing mechanism. This means that the weighing mechanism must always be at rest at least four seconds just prior to the printing.

When the timing mechanism times out and the arm 63 engages with the contact 64, current will flow from the power lead 29 through a set of normally closed contacts 68, through a lead 69 connected to one end of the arm 63, through the arm 63, through the lead 65 to the white light 14, and then through the opposite side of the line. When the light 14 goes on, it indicates to the driver that the printer is operating. Current also flows from the lead 65 through a branch lead 70, through lead 71, to a printer motor 72 and then through the return lead 33. The printer motor 72 commences to rotate a pair of cams 73 and 74 in a clockwise direction. As the cam 73 rotates, a finger 75 lifts up on a hump 76 of the cam to close a set of normally open contacts 77. The contacts 68 remain closed when the finger 75 is raised. Current now flows from the power lead 29 through the closed contacts 68 and 77 and then through the lead 71 to the printer motor 72. Since the contact 77 has been closed it does not matter if the timer 25 resets since current flow now by-passes the arm 63. As the cams 73 and 74 further rotate, a finger 78 raises on the hump 76 to close its normally open contacts 79. At this time the closing of the contacts has no effect on the printer motor operation. This merely sets up a step which will follow later.

The cams 73 and 74 rotate further until the cam 74 causes a finger 80 to raise and close a set of normally open contacts 81. Closing of the contacts 81 causes current to flow from the power lead 29 through the closed contacts 81, a lead 82, a branch lead 83, to a full-wave rectifier 84, and then through a lead 85 and the opposite side of the line. The rectifier 84 causes direct current to operate a printer solenoid 86 to make an imprint of the weight indication on the ticket 13. Shortly after the contacts 81 were closed by the cam 74, the finger 75 raised on a second hump 87 of the cam 73 and caused the contacts 68 to open.

When the printer solenoid was energized, it closed a set of normally open contacts 88 and caused current to flow from the power lead 29 through a lead 89, the closed contacts 88, a lead 90, to the coil of the relay 39, and then through a lead 91 and the opposite side of the line. Energization of the relay 39 opens its contacts 38, stopping current flow to the relay 41, 49, and 54, and also to the timer 25. When de-energized, the timer resets. As the cam 74 further rotates, the finger 80 drops off the cam 74 and the contacts 81 open to de-energize the solenoid 86. De-energization of the printer solenoid 86 opens its contacts 88 and stops current flow to the relay 39. The contacts 38 of the relay 39 close, but none of the relays nor the timer 25 can be energized unless one of the air hoses 11 or 17 is again operated.

When the timer 25 was reset, current flowed from the power lead 29 through a lead 92, the arm 63 of the timer 25, the lead 69, through the closed contacts 77, through the lead 71, and to the printer motor 72 to keep the motor running at normal speed. The motor continues at that speed until the cam 73 rotates enough to cause the finger 75 to fall from the hump 87 to open the contacts 77. Current can no longer flow from the lead 29, the lead 92, etc., to the printer motor 82. But since the contacts 79 were closed previously, and are still closed, current flows from the power lead 29 through a lead 93, the closed contacts 79, a half-wave rectifier 94, and then through the leads 70 and 71 to the motor 72. During energization through this path, the motor creeps to cause the cams 73 and 74 to move slowly until the finger 78 falls off the hump 87 to open the contacts 79. Current flow to the motor is then stopped, and the cycle for weighing the wheel load has been completed.

When the truck is moved ahead after the weighing and printing operations have been completed, the hose 17 is tripped to cause a set of pneumatically-operated contacts 95 to be closed. The contacts 95 are in parallel with the contacts 28. Therefore, operating either one of them will set in operation the cycle just described. If desired, only one set of pneumatic contacts may be used, but then they must be operated by either or both of the air hoses 11 and 17.

The embodiment of my invention herein shown and described is to be regarded as illustrative only and it is to be understood that the invention is susceptible to variations, modifications, and changes within the spirit and scope of the subjoined claims.

Having described the invention, I claim:

1. In a weighing scale adapted to weigh the load on one wheel at a time of a truck moving along a surface, in combination, a flat deck type load receiver mounted substantially in the plane of said surface and having diagonally opposite live decks staggered with respect to each other in the direction of travel of the truck to be weighed and separately supported dead decks covering the remainder of said load receiver, weighing mechanism operatively connected to the live decks, automatic means for printing impressions of the weight of each wheel load, timing mechanism, said timing mechanism being adapted to prevent printing until a prescribed time interval has elapsed after a load has been placed on the load receiver, automatic means for resetting the timing mechanism should the load receiver be disturbed during weighing, and means for signalling the driver when the priniting of the weight record has been completed.

2. A flat deck type load receiver for a scale for weighing one wheel load at a time of vehicles moving along a surface having diagonally opposite live decks staggered with respect to each other in the direction of travel of the vehicle to be weighed exposed for reception of load and separately supported dead decks covering the remainder of said load receiver, said load receiver being mounted substantially in the plane of said surface.

3. In an apparatus for weighing vehicles moving along a surface, a pair of flat deck type load receivers that are supported as a unit and that are staggered with respect to each other in the direction of travel of the vehicle to be weighed, and weighing scale mechanism serving as the sole support for each of said load receivers, said load receivers being mounted substantially in the plane of said surface.

4. The invention set forth in claim 3 including means for signalling to a driver of the vehicle when a wheel load is in weighing position.

References Cited in the file of this patent

UNITED STATES PATENTS

| | | |
|---|---|---|
| 1,458,920 | Troll | June 12, 1923 |
| 1,479,581 | Berry | Jan. 1, 1924 |
| 1,494,164 | Goldbeck | May 13, 1924 |
| 2,083,783 | Haegele | June 15, 1937 |
| 2,339,152 | Connelly | Jan. 11, 1944 |
| 2,410,654 | Hem | Nov. 5, 1946 |
| 2,543,794 | Mayer | Mar. 6, 1951 |
| 2,653,475 | Kraus | Sept. 29, 1953 |